Figure 1:
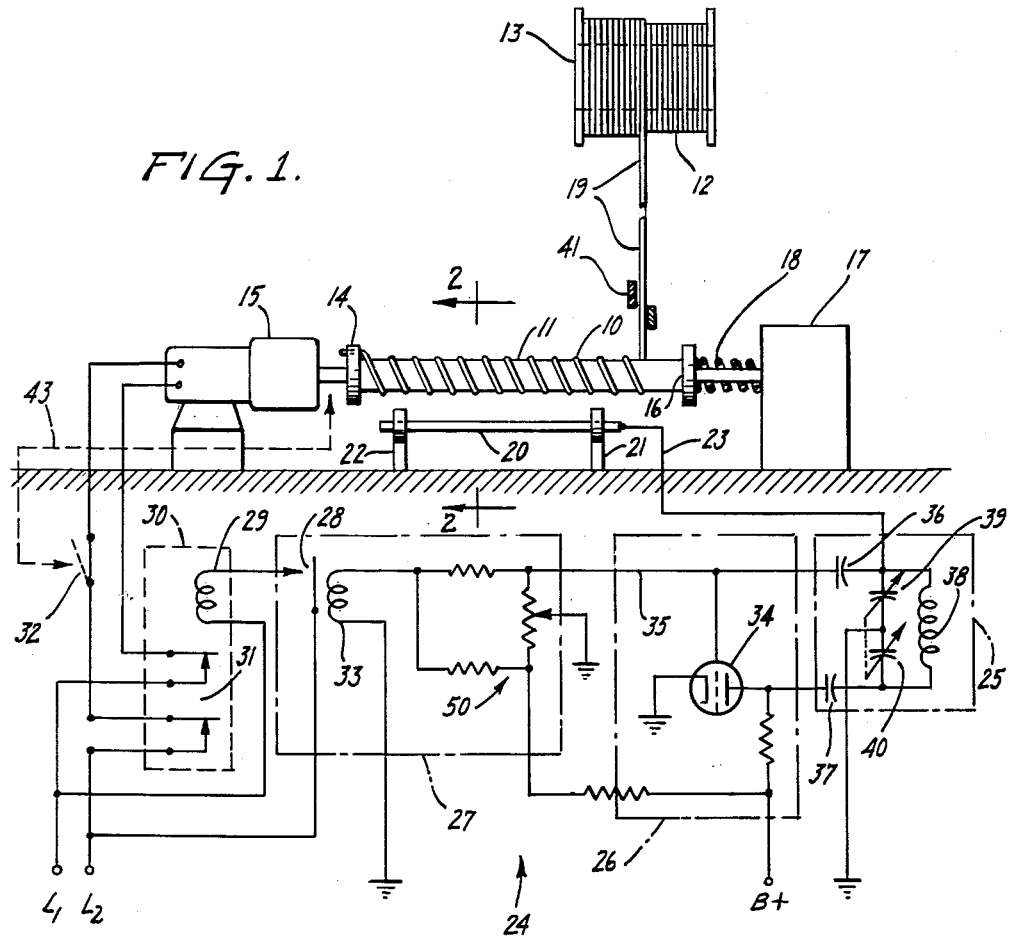

Feb. 20, 1962 C. G. SIMPSON ETAL 3,022,019
FABRICATION OF ELECTRICAL CIRCUIT COMPONENTS
Filed Nov. 27, 1959 2 Sheets-Sheet 1

INVENTORS
CHARLES G. SIMPSON
SERGE LOGINOW
BY

AGENT

Feb. 20, 1962     C. G. SIMPSON ETAL     3,022,019
FABRICATION OF ELECTRICAL CIRCUIT COMPONENTS
Filed Nov. 27, 1959     2 Sheets-Sheet 2

INVENTORS
CHARLES G. SIMPSON
SERGE LOGINOW
BY
F. D. Raja
ATTORNEY

United States Patent Office 3,022,019
Patented Feb. 20, 1962

3,022,019
FABRICATION OF ELECTRICAL CIRCUIT
COMPONENTS
Charles G. Simpson, Bristol, and Serge Loginow, Philadelphia, Pa., assignors to Philco Corporation, Philadelphia, Pa., a corporation of Pennsylvania
Filed Nov. 27, 1959, Ser. No. 856,330
13 Claims. (Cl. 242—9)

This invention relates to the fabrication of electrical circuit components, particularly of coils. It provides apparatus for and a method of automatically making coils of predetermined inductance. The device or process can also be used for winding a coil to a predetermined value of parameters other than inductance but related thereto, such as self-resonant frequency.

This disclosure is a continuation-in-part of an application filed on December 31, 1956, under Serial No. 631,675 wherein the subject matter of the first sheet of drawings appended hereto, was illustrated and described.

Heretofore the winding of coils had to be controlled, in practice, by time-consuming and inaccurate procedures. For instance, a coil was wound to a predetermined number of turns, such as fifty turns; it was then tested for inductance. When this was found to be too high, some amount of wire, such as five complete turns was removed; there followed, sometimes, another testing operation, another modification of the coil, and so on. This trial and error procedure was tedious as well as lacking in precision. In other arrangements of the prior art it was attempted to control the winding process automatically, but devices of the latter type were either of such complexity as to be impractical, or able only to wind a coil to a predetermined resistance and length. Even this last-mentioned process was practical only for bare, uninsulated wires; and it tended to be almost as inaccurate as the trial and error procedure. Contact members had to engage the wire slidingly, thereby involving a problem of variable conductance which tended to intorduce error in the desired resistance measurement.

It is the basic object of our invention to minimize these and other limitations and shortcomings of prior systems.

A specific object of the invention is to provide coil winding means and operations which automatically and precisely establish a predetermined inductance, or related characteristic, in the coils wound thereby.

Another specific object is to provide such means and operations which can be used whether the wire be insulated or uninsulated.

Another important object of the invention relates particularly to coils wound on iron cores and the like. The object is to wind the coils to a predetermined inductance even in the event that the magnetic permeability of the core is irregular, in that it either is not quite in accordance with a predetermined standard or is not quite uniform along the core.

Still another object is to provide automatic coil winding apparatus which is economical in operation as well as construction.

A preferred embodiment of the invention, wherein an antenna coil is made by winding insulated wire on a ferrite core, under the control of alternating energy applied by a capacitive or other non-conductive coupling element and a grid dip meter circuit, is shown in the drawing appended hereto.

Figure 2:
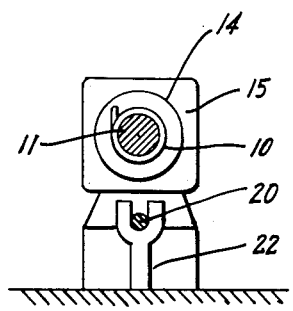
Figure 3:
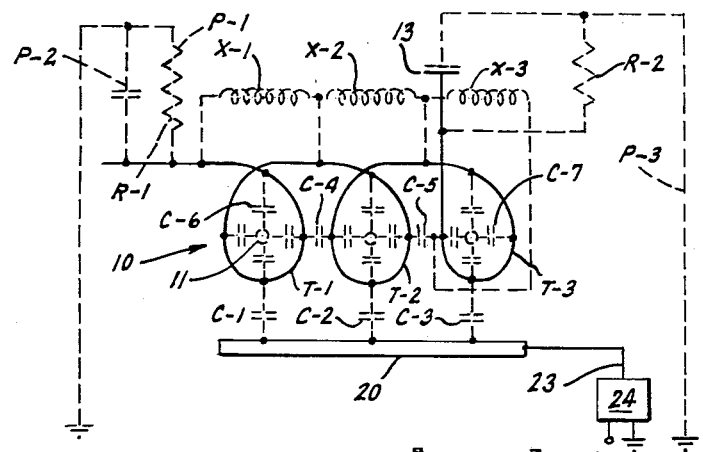
Figure 4:
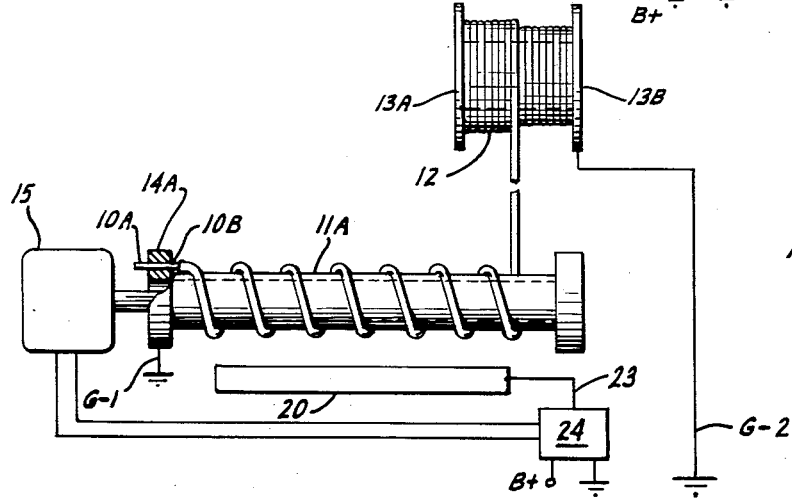
Figure 5:
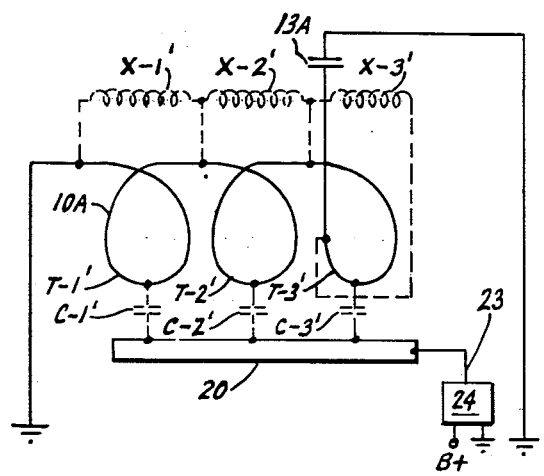

FIGURE 1 is a partially diagrammaitc showing of said embodiment; FIGURE 2 is a section taken along line 2—2 in FIGURE 1; FIGURE 3 is a schematic showing of said embodiment; FIGURE 4 is a partially diagrammatic showing of a modified embodiment; and FIGURE 5 is a schematic showing of the modified embodiment.

Referring first to FIGURE 1, a coil 10 is wound on a core 11; and for this purpose wire 12 is unwound from a reel 13. Core 11 is centered on and rotated by a chuck member 14, mounted on the power shaft of a motor unit 15, and the free end of the core is held by an idler chuck 16 mounted on a support 17 and loaded by a spring 18. The chucks 14, 16 may be non-conductive. In order to mechanically facilitate the reel-unwinding and coil-winding operations, a substantial length of straight wire 19 is provided between the reel and the coil; and it will be seen hereinafter that such provision also facilitates the electrical process of controlling the winding of the coil.

At the start of the winding operation the free end of wire 12 from reel 13 is suitably secured to one of the chucks; according to the drawing it has been secured to chuck 14. The drawing shows the apparatus at a moment when the winding is almost complete and when a terminal portion of the coil has been wound to a point adjacent the other chuck 16. Inherently, a circuit element of appreciable capacitance is provided, in series with coil 10, by wire 19 and the unused portion thereof on reel 13. For present purposes, it can be assumed that said reel like the aforementioned chucks 14, is non-conductive.

FIGURE 3 will now be referred to for purposes of a more detailed electrical analysis. No matter how well the operating chucks and the wire itself may be insulated, it is well understood that electrical charges, carried by the wire, will tend at least in small part to leak away. Accordingly the figure shows a direct resistively coupled leakage path at P–1 and a capacitively coupled leakage path at P–2. The leakage may carry either all or part of the charges, present in the wire, to the ground; leakage path P–1 can accordingly be represented as including resistance R–1. In somewhat similar manner leakage takes place through the conductive wire material, present on reel 13, which is at least capacitively coupled to the atmosphere, as indicated at P–3, thus providing an additional circuit branch leading to ground, the resistance of which is represented by equivalent circuit element R–2.

In accordance with the present invention, the operation of winding coil 10 is supervised by an element, such as a brass rod 20 (FIGURE 1), reactively and non-conductively coupled with the coil 10 and thereby with the more complete circuit P–1, P–2, 10, P–3. As illustrated, rod 20 extends adjacent the core and desirably parallel to the same; it is supported by insulating members 21, 22. The rod is connected, by conductor 23, with a control system 24; and it receives alternating or oscillatory electrical energy through this conductor, from an oscillator tank circuit 25, forming part of this system 24. The tank circuit is associated with a power supply unit 26 and a grid voltage metering device 27, also forming parts of system 24.

Metering device 27 comprises a metering switch 28, which controls the passage of current from power lines L–1, L–2 to the coil 29 of a power relay 30, while the switch 31 of this relay controls the passage of current from said power lines to the coil winding motor unit 15. In particular, the closing of the metering switch 28 opens the power switch 31, thereby stopping a coil winding operation of motor unit 15. On the other hand, the opening of the metering switch 28 closes power switch 31, thereby allowing the winding operation to begin upon the closure of a start switch 32 which may be provided in series with power switch 31 and motor 15.

In the position shown, the winding motor 15 is energized from L–1, L–2 through the closed starting switch 32 and relay switches 31. The metering switch 28 is open, as a positive grid voltage is supplied to the metering coil 33 of the grid dip metering system 27. This voltage is derived from the B plus supply of the power source 26, which supply is shown as connected to the plate of a triode tube 34, the cathode being grounded and the grid being connected with the metering coil 33 by a conductor 35. The grid and plate of tube 34 are further connected, across capacitors 36, 37, respectively, with oscillator 25. This oscillator provides a predetermined frequency of oscillation, the range of which is selected by the use of a suitable oscillator coil 38 and the exact value of which can be adjusted by a pair of adjustable oscillator capacitors 39, 40; the exact connections between these illustrated elements being well known and it being equally known that various equivalents can be used.

In FIGURE 3 the cooperative arrangement of control system 24, coupling element 20 to coil circuit P–1, P–2, 10, P–3, is indicated by a series of broken-line showings, including a series of capacitor symbols C–1, C–2, C–3, associated with correspondingly numbered turns T–1, T–2, T–3 of coil 10. As indicated by these symbols, capacitive coupling is provided between metal rod 20 and adjacent portions of turns T–1, T–2, T–3, etc. In addition, so-called distributed capacity is present within the coil itself, which is indicated in part by further similar symbols C–4, C–5, between mutually adjacent portions of said turns. Still further, similar symbols C–6, C–7, etc., indicate such capacitive coupling as exists between the coil and the conductive particles of the surrounded ferrite core 11.

The oscillations of tank circuit 25 supply a voltage of predetermined frequency to the coupling rod 20; and so long as the coil being wound has less than its ultimate distributed capacity, as indicated at C–4, C–5, C–6, C–7, the oscillator frequency is less than equal to the self-resonant frequency of said coil. As a result, the grid potential, a function of which is applied to one terminal of metering coil 33, remains high enough to keep the metering switch 28 open and thus to keep the power switch 31 closed and the winding motor 15 operating. As soon however as the coil winding process has wound coil 10 to the desired extent, in terms of a predetermined self-resonant frequency, and has thereby also provided the predetermined inductance, indicated by a series of equivalent inductor symbols X–1, X–2, X–3 corresponding respectively to turns T–1, T–2, T–3, there is established a tuned condition, with resonant coupling between coil 10 and oscillator tank circuit 25 (FIGURE 1).

Thus it will be seen that the coil circuit P–1, P–2, 10, P–3 is gradually tuned to the control circuit 25, by the continued winding of coil 10, whereupon said coil circuit sustains oscillation at the frequency prevailing in the control circuit. The resonant coupling of the coil and control circuits is effected by way of part 20; that is, in the embodiment shown and described with reference to elements C–1, C–2, C–3 of FIGURE 3, the coupling is primarily capacitive.

Coil 10 now draws substantially increased energy from oscillator tank circuit 25 (FIGURE 1). The oscillator, in response to this increased loading, undergoes a substantial decrease in grid current, thereby reducing the current in coil 33 and thus closing the metering switch 28. This acts to energize the power relay coil 29, opening relay switch 31 and stopping motor unit 15.

A very few oscillations at megacycle frequency are sufficient to initiate the reversal of metering switch 28; and a very few cycles of the power current supplied by terminals L–1, L–2, which cycles are typically performed in a few dozen microseconds, are sufficient to complete the stopping of the motor, thereby insuring, with typical coil winding speeds, a high accuracy of the automatic control applied to the winding of coil 10.

The wire 12 can then be severed, for instance by some suitable manual or automatic cutting means 41, between the straight length 19 and the completed coil 10; and core 11, with coil 10 thereon, can then be removed and a new core inserted for the winding of a new coil.

The oscillator 25 may, in the meantime, continue to operate. As soon as the finished coil 10 is removed from the machine, full grid voltage reappears, the metering coil 33 is strongly energized again, thereby opening switch 28 and closing switch 31. The motor current may still be interrupted by switch 32, which may desirably be opened by some suitable linkage 43 of well-known type, forming no object of the present invention, at the moment when motor 15 is stopped. A new coil winding process starts when switch 32 is closed, for instance by manual operation of this linkage 43.

In this way, cores 11 of widely variable permeability can be provided with coils of either bare or insulated wire, providing accurately predetermined inductance, self-resonant frequency and related characteristics; the variations of permeability of the core are reflected only by a corresponding, automatic variation of the length of the coil.

For instance it may be assumed, as a specific example, that in order to provide coil 10, a supply of "No. 28" enamel-insulated copper wire shall be wound, with seventeen turns per inch on a core 11 of ferrite material comprising magnetic particles embedded in a binder. It may further be assumed that the desired inductance of coil 10 shall be 275 microhenrys, at a frequency in the range from ½ to 1½ megacycles. The average specific permeability of ferrite as used in the cores may be of the order of 200; and the average effective permeability, in case of bar-shaped cores, may be 50. On a core of such average effective permeability, having for instance ⅜-inch diameter, the coil should have a normal length of 5.75 inches to provide said 275 microhenrys. However, both specific and effective permeabilities of the core may vary by as much as plus or minus 15%, mainly because of differences of iron particle size and spacing; and the result is that the inductance of an otherwise suitable coil, having the standard length of 5.75 inches, may vary between 235 and 316 microhenrys.

The apparatus described has practically eliminated this variation by correspondingly varying, instead, the length of the coil, which accordingly may change between about 4.85 and 6.55 inches, while the desired inductance of 275 microhenrys is provided.

If, as a more specific example, the coil 10 shall have said 275 microhenrys at 1.2 megacycles, oscillations of this frequency are generated in the tank circuit 25 by selection and use of a proper coil 38 and preliminary adjustment of capacitors 39, 40. The system can then be calibrated or adjusted for proper control of the desired inductance, by first operating it with a sample coil, having a known inductance of 275 microhenrys, in place of coil 10, and by then readjusting the trimmer capacitors 39, 40 until the meter switch 28 closes, at which time the relay switch 31 opens and motor 15 stops. Thereupon the system is ready for the automatic operation, already described. Such operation then results in the production of coils 10 wound on consecutive cores 11 and having practically uniform inductance, for instance with a tolerance of one percent inductance variation for 80 percent of the coils produced and 1½ percent inductance variation for the remaining 20 percent, while permeability of the core as indicated varies by as much as plus or minus 15 percent.

It is also possible, by a conventional sensitivity adjustment 50, to vary these tolerances at will; but it may be desirable for a variety of reasons, not to make the sensitivity or precision of the grid dip response too sharp. The maintenance of a moderate tolerance, such as the 1 1½ percent mentioned, allows for instance the use of the relatively simple procedure described, wherein no particular shielding is required for the coil and pick-up 10, 20 and wherein it is a matter of indifference how much wire 12 remains on reel 13, how it is arranged on the reel, and exactly how far it is spaced by the straight portion 19 from the coil 10 to be wound.

It will be realized by persons skilled in the art that the procedure and instrumentation described can be modified in many respects. For instance, instead of winding a plain coil 10, the process can be used to wind tapped coils or other, relatively complex units. The cores as well as the wires used may be of different form, material and construction; for instance FIGURE 4 shows a hollow core 11A, which may consist of non-conductive material such as cardboard, and further shows a wire 10A having heavy insulation 10B thereon. Additionally this figure shows actual ground connections G–1, G–2, directly coupled to a conductive chuck 14A of core 11A and side wall 13B of reel 13A, in lieu of the equivalent ground connections P–1, P–2, P–3 of FIGURE 3. The impedance values of ground connections G–1, G–2 may be insignificant. The internal capacitance elements C–6, C–7, indicated in FIGURE 3, are also likely to be insignificant in the modified embodiment, and the showing of such elements is accordingly omitted in FIGURE 5. It will however be noted that each turn T–1′, T–2′ etc. again has inductance X–1′, X–2′, etc. and also has capacitive coupling C–1′, C–2′, C–3′, etc. with coupling rod 20. Thus it is clear that in principle, the operation of the modified system is similar to that which has been described with respect to FIGURES 1 and 3. It will also be understood that the use of a capacitive pick-up 20 and of a grid dip circuit 26, 27 can be replaced by other expedients and many other modifications can be applied.

We claim:

1. In the fabrication of electrical components: gradually forming a component in such manner as to progressively change the electrical resonant frequency thereof; maintaining, during at least part of such forming, an alternating electrical current in a circuit non-conductively coupled to the component being formed; sensing a characteristic of said alternating current which is variable in response to the resonant frequencies, successively prevailing in the component coupled to said circuit; and controlling said gradual forming in direct response to said variable characteristic of said current and thereby in response to the provision of a predetermined resonant frequency of the component.

2. In the fabrication of electrical coils having, when finished, a predetermined parameter related to inductance: winding wire to gradually form such a coil, thereby gradually providing inductance and distributed capacity and changing said parameter; reactively and non-conductively feeding to the coil, while so winding it, alternating electrical energy so that said inductance and distributed capacity in combination present a variable load on the supply of said energy; and controlling said winding in response to said load.

3. In the fabrication of electrical components such as coils: gradually forming one of the components in such manner as to progressively change the electrical resonant frequency thereof; maintaining during at least part of such forming an alternating electrical current in a circuit non-conductively coupled to a circuit which includes the component being formed; sensing a characteristic of said alternating current which characteristic is variable in response to the resonant frequencies successively prevailing the component being formed; and controlling said gradual forming in direct response to said variable characteristic of said current and thereby in response to the provision of a predetermined resonant frequency of the component.

4. In the fabrication of electrical coils having, when finished, a predetermined parameter related to inductance: winding wire to gradually form such a coil, thereby gradually providing inductance and distributed capacity and changing said parameter; reactively and non-conductively feeding to a circuit, including the coil being wound, alternating electrical energy so that said inductance and distributed capacity in combination present a variable load on the supply of said energy; and controlling said winding in response to said load.

5. A method of winding coils of predetermined inductance and resonance on magnetic cores of variable permeability, characterized by the steps of coupling a circuit, including the coil being wound, with a further circuit; maintaining an electrical oscillation of a frequency related to said predetermined resonance in said further circuit; sensing a function of the so maintained oscillation; and controlling the winding of the coil by said function.

6. The method of claim 5 wherein said sensing comprises establishing resonant coupling between the coil being wound and said circuit.

7. The method of claim 5 wherein said sensing comprises measuring a grid voltage in the system for maintaining said oscillations.

8. In apparatus for fabricating electrical coils: a motor for winding wire into a coil; a circuit for said motor; coupling means non-conductively coupled with a circuit including the coil being wound; a sensing circuit for energizing said coupling means in a way related to a desired characteristic of the coil being wound; and means controlled by the sensing circuit for controlling the motor circuit.

9. Apparatus as described in claim 8 wherein the coupling means comprises a metal rod extending along the core whereon the coil is being wound.

10. Apparatus as described in claim 8 wherein the sensing circuit includes an electronic oscillator and the means controlled thereby includes a grid dip metering switch and a relay switch controlled thereby and interposed on the motor circuit.

11. In apparatus for fabricating electrical coils: a motor for winding wire into a coil; a circuit for said motor; reactive coupling means non-conductively coupled with the coil being wound; a sensing circuit for energizing said coupling means in a way related to a desired characteristic of the coil being wound; and means controlled by the sensing circuit for controlling the motor circuit.

12. In apparatus for winding a coil, said coil having the characteristics of a resonant electrical circuit by virtue of the inherent presence across the turns of said coil of inductance and distributed capacity: a circuit for generating an electrical current of predetermined operating frequency; reactive means coupling said generating circuit to said coil, so that said coil presents a substantial load on said generating circuit when the resonant frequency of said coil substantially reaches the operating frequency of said generating means; and means connected in said generating circuit, responsive to said loading, for terminating the winding operation.

13. Apparatus as described in claim 12 wherein the reactive means is a metallic member capacitively coupled to said coil.

References Cited in the file of this patent
UNITED STATES PATENTS

| | | |
|---|---|---|
| 1,921,869 | Ewald | Aug. 8, 1932 |
| 2,725,199 | Bower | Nov. 29, 1955 |
| 2,782,368 | McCarthy | Feb. 19, 1957 |
| 2,820,987 | Bunch | Jan. 28, 1958 |